PURIFICATION OF OLEFINIC POLYMERS OBTAINED IN LIQUID PHASE

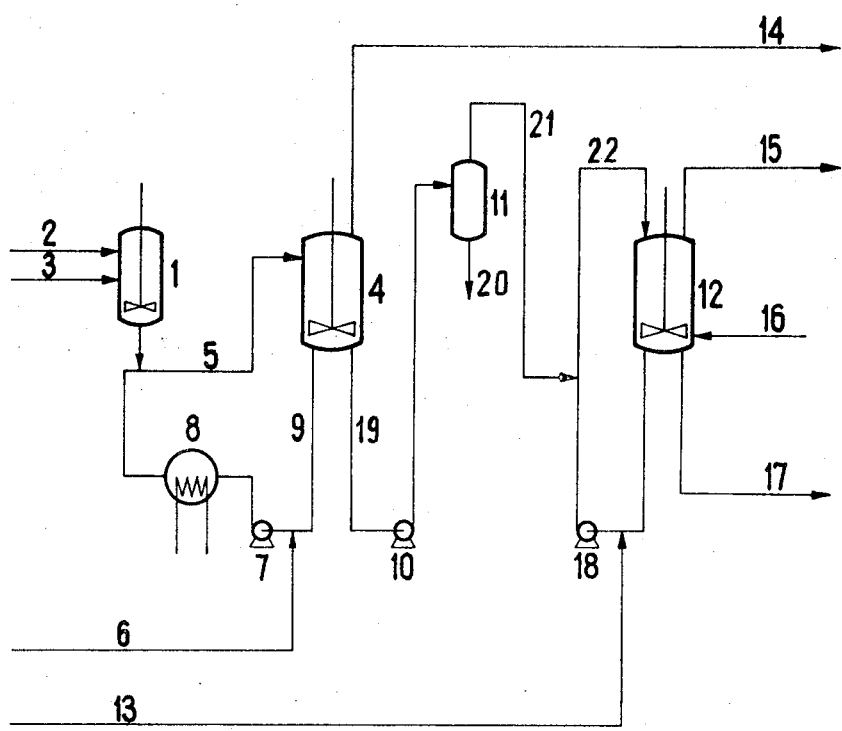

Giovanni Di Drusco and Paolo Galli, Ferrara, Italy, assignors to Montecatini Edison S.p.A., Milan, Italy
Continuation of abandoned application Ser. No. 698,210, Jan. 16, 1968. This application Apr. 9, 1971, Ser. No. 132,886
Claims priority, application Italy, Jan. 18, 1967, 11,612/67
Int. Cl. C08f 1/88
U.S. Cl. 260—80.78      10 Claims

ABSTRACT OF THE DISCLOSURE

Removing catalyst residues from elastomeric olefin polymers prepared with Ziegler-Natta type catalysts by washing with known aqueous washing solutions in presence of liquified polymerization monomers. Desirably, solvent for polymers is also present.

CROSS-REFERENCE TO RELATED APPLICATION

This applicaion is a continuation of copending application Ser. No. 698,210, filed Jan. 16, 1968, now abandoned.

BACKGROUND OF THE INVENTION (1) Field of the Invention

The present invention relates to a process for purifying by removing catalyst residues from, saturated or unsaturated elastomeric olefin polymers or copolymers produced in liquid phase, more particularly by suspension polymerization, in the presence of catalysts comprising transition metal compounds and organimetallic compounds.

(2) Description of the prior art

Saturated or unsaturated, amorphous, elastomeric olefin copolymers are known in the art. These include copolymers of ethylene with propylene, and terpolymers of ethylene with propylene and with a cyclic or acyclic non-conjugated diolefin, such as 1,5-cyclooctadiene, 1,4-hexadiene, 6 - methyltetrahydroindene, methylene-norborene, ethylidene-norbornene, etc. These copolymers and terpolymers are usually produced by suspension processes, in the presence of catalytic systems consisting of compounds of the transition metals of Group V of the Periodic Table of Elements, preferably vanadium compounds, such as vanadium triacetylacetonate, vanadium oxychloride, and of organometallic compounds of metals of Groups I to III of the Periodic Table of Elements, preferably aluminum compounds.

In such processes, it is necessary to purify the polymeric compounds by removing the catalyst residues therefrom because, besides contributing to the formation of ash content in the polymeric product, the presence in the polymer of these residues promotes the occurrence of oxidative degradation processes with consequent loss of quality of the polymeric product.

It is known from the prior art to purify elastomeric products in solution in suitable organic solvents, by a process comprising washing the polymer solutions with aqueous solutions of suitable extracting agents which are capable of forming water soluble compounds with the catalyst residues, and subsequently separating the aqueous phase from the organic phase. Thereafter, a polymer nearly free from catalytic residues is recovered from the organic phase. The aqueous washing solutions usually comprise as extracting agents compounds selected from the group consisting of inorganic and organic acids and bases (e.g. NaOH, HCl, $CH_3COOH$, etc.).

The purifier polymers can be used in any of the applications where synthetic rubbers have been used hitherto.

However, washing with aqueous solutions of extracting agents, complexing agents, etc. is feasible only if applied to solutions of the polymer. That is, poor results are obtained when such washing is attempted for purifying polymers in suspension, due to poor contact between the extracting agent and the catalyst residues. Consequently, it is generally preferred to dissolve the polymer in suspension by means of suitable organic solvents, and then to wash it with extracting solutions in the way used for purifying the polymers obtained in solution. This process is time consuming and expensive. Accordingly, the difficulties connected with the purification of polymeric suspensions have, to that extent, reduced the attractiveness of the suspension polymerization process.

One feature which is common to the prior art methods for purifying the polymers prepared by suspension processes is that the volatile monomers are vented out of the reactor at the end of the polymerization and the polymer or, preferably, the dissolved polymer is subsequently washed with the aqueous extracting solutions in the absence of the monomers.

SUMMARY OF THE INVENTION

The present invention provides a process for purifying saturated or unsaturated elastomeric olefin polymers or copolymers, particularly polymers or copolymers obtained by suspension processes, which process will yield an end product which is free or almost free from the catalyst residues, and is, at the same time, an economic improvement compared to the known expensive processes. This process comprises purifying the elastomeric polymers or copolymers by means of a washing with the usual aqueous solutions of extracting agents in the presence of one or more polymerizable volatile monomers in the liquid state, and, optionally, in the presence of a small quantity of a solvent for the polymer. More particularly, the present invention provides a process for purifying saturated or unsaturated olefinic polymers or copolymers, obtained in the presence of catalysts comprising transition metal compounds and organometallic compounds, particularly polymers or copolymers obtained by suspension processes, which process comprises washing out the catalyst residues from said polymers or copolymers by means of conventional aqueous solutions of extracting agents and, desirably, complexing agents, optionally in the presence of oxidizing agents, wherein the washing is performed in the presence of one or more polymerization monomers maintained in the liquid state and preferably used in amounts of from about 1.5 to 10 kg./kg. of polymer, and preferably in the presence of a solvent for the polymer, which solvent is insoluble in the aqueous phase and is used, preferably, in amounts from about 0.5 to 5 kg./kg. of polymer.

BRIEF DESRIPTION OF THE DRAWING

The figure is a schematic diagram illustrating a preferred, continuous process for carrying out the present invention.

DESCRIPTION OF THE PREFERRED EMBODIMENTS

The aqueous washing solutions usually comprise extracting agents selected from the group consisting of organic and inorganic acids and bases (e.g.: NaOH, HCl, $CH_3COOH$, etc.), complexing agents such as tartaric acid and its salts, gluconic acid and its salts, etc., and optionally comprise also oxidizing agents.

As a solvent for the polymer, it is possible to use aliphatic, cycloaliphatic or aromatic hydrocarbons, or mixtures thereof.

By performing the washing in the presence of volatile polymerization monomers in the liquid state, the polymer is maintained in a state of great subdivision and swelling, which promotes intimate contact of the polymer with the aqueous washing solution thereby enhancing removal of the catalytic residues. This close contact could not occur in the absence of the monomers because in such case the polymer agglomerates into compact microaggregates.

The presence, during the washing, of moderate quantities of an organic solvent for the polymer results in a very low viscosity of the ternary polymer-solvent-monomer mixture in the washing vessel, for the monomers are not solvents for the polymer. Emulsifying this mixture with the aqueous solution achieves much more effective results than those obtained using a solvent amount equal in weight to the total of both the solvent and monomer actually used. The ternary polymer-solvent-monomer mixture shows, at equal temperatures, and equilibrium pressure decidedly lower than that of a polymer-monomer mixture. Because of this, the polymerization slurry is discharged from the reactor at a temperature equal to or higher than that of the reaction.

In order to shorten the washing time, a suitable grinding device can be employed. This device is usually a mill with revolving blades or any other known apparatus employed for comminuting polymeric material. The contents of the reactor are discharged into the washing vessel under such temperature and pressure conditions that the volatile monomers are kept in the liquid state. In the washing vessel, the reaction slurry is thoroughly mixed with an aqueous solution containing the chemical agents for dissolving the catalyst residues and with suitable amounts of an organic solvent for the polymer. After the washing, the two phases are separated, the organic phase is mixed with pure water, and then, after expansion of the mixture, all volatile components are evaporated.

The polymer, suspended in an aqueous phase, can then be recovered by usual methods.

Alternatively, the reactor can be vented as usual, and the reaction slurry is fed into the washing vessel. One or more monomers in the liquid state and the solvent for the polymer can then be added to the washing vessel in the required amount as set forth above.

The purifying process of the present invention can be usefully applied also to elastomeric polymers or copolymers obtained in solution, as, e.g., polybutadiene, ethylene-propylene copolymers, ethylene-propylene - nonconjugated cyclic or acyclic diene terpolymers, etc. Also in this case it is necessary to maintain in the washing vessel such pressure and temperature conditions that the volatile monomers are in the liquid state. The washing should be carried out in the same way as for suspension polymers. Of course, there would be no need for adding further solvent to the washing vessel. It is preferable, however, to add further liquid monomer or other non-solvent liquid in order to reduce the viscosity of the polymer solution.

The presence of unreacted monomers in the liquid state, during the washing, reduces the viscosity of the organic solution to values much lower than they would be in the absence of such monomers, even with the same ratios of polymer to solvent.

In order to obtain a sufficient difference of pressure between the washing vessel and the reactor, the washing vessel can be kept at a lower temperature than that of the reactor. Alternatively, a part of the more volatile monomers (e.g., ethylene) can be vented out from the mixtures of monomers.

The process of the invention can be carried out continuously in apparatus as schematically illustrated in the enclosed drawing. As illustrated in said drawing, monomers and catalysts are fed into polymerization reactor 1 through inlet pipes 2 and 3. The reaction slurry is discharged from the bottom of reactor 1 into washing vessel 4 via conduit 5. An aqueous solution containing extracting agents, complexing agents, and possibly, a certain amount of solvent is added to vessel 4 through pipe 6. Part of the slurry and of the washing solution is discharged from the bottom of washing vessel 4 through pipe 9 and is pumped by pump 7 through heat exchanger 8. Then it is mixed with the slurry discharged from the reactor 1 and is finally recycled to the washing vessel 4. In this way, transportation of the slurry is accomplished with an effective thermal exchange.

Another part of the slurry containing the washing solution is discharged from the bottom of vessel 4 through pipe 19 and is fed by pump 10 into a phase separator 11 from which the aqueous phase is removed through discharge conduit 20 and the organic phase passed on through conduits 21 and 22, to a stripper 12 where it is dispersed into pure water charged to stripper 12 through pipe 13 and conduit 22 by circulating pump 18.

The polymer, recovered by known methods, is finally submitted to the usual finishing operations, e.g., by stripping with steam introduced through pipe 16, and then discharged through the outlet pipe 17.

Both the washing vessel and the stripper are suitably equipped to vent the monomers through pipes 14 and 15, respectively. The monomers are recovered separately and may be recirculated to reactor 1.

The desired temperature in the washing vessel can be maintained, in addition to the heat exchange means illustrated also by boiling and recycling the vapors after condensation.

The pressure in the washing vessel should be conveniently kept at the desired value by means of a pressure regulatinng device, while the temperature should be stabilized depending on the monomer-solvent ratio.

Of course, in order to maintain continuous feeding into the phase separator 11, of the part of the mixture withdrawn from the washing vessel through pipe 19, it is necessary to maintain a constant level in the washing vessel itself.

In processes operating with a discontinuous cycle, the washing (after the slurry has been discharged from the reactor) can occur also at higher temperatures than the reaction temperatures.

The following examples are presented to further illustrate the present invention and are not intended to limit in any way the scope thereof.

EXAMPLE 1

Employing apparatus as illustrated in the drawing, 15 l. of water containing 5% by weight of NaOH and 0.004% of sodium dodecylbenzenesulphonate were introduced into a 40 l. washing vessel equipped with a stirrer and with a cooling jacket which operates by evaporation of propylene. Then 2 l. of toluene were added with stirring, and the resulting emulsion cooled to a temperature of 4° C. under a nitrogen atmosphere. Then 0.5 l. of air was introduced. 10 l. of a reaction slurry containing 25% by weight of an ethylene/propylene (45% by weight)/6-methyltetrahydroindene (4.5% by weight) terpolymer (Mooney viscosity, ML (1+4) 100° C.=95±5) in liquid propylene were added. The terpolymer was produced in suspension in liquid propylene in the presence of a catalyst consisting of $AlEt_2Cl + VOCl_3$ and of $ZnEt_2$ as molecular weight regulator.

The raw polymer was analysed and showed the following contents of catalyst residues:

V (vanadium)=565 p.p.m. (parts per million)
Al (aluminum)=1750 p.p.m.
Cl (chlorine)=3500 p.p.m.

After 1 hour of the washing cycle, these values were lowered to:

V=20 p.p.m.   Al=31 p.p.m.   Cl=370 p.p.m.

EXAMPLE 2

In the apparatus described in Example 1, under the same operating conditions and in the presence of the same quantities of the same washing solution and solvent, the purification of 10 l. of a liquid propylene suspension containing 27% by weight of an ethylene/propylene (55% by weight) copolymer (ML (1+4) 100° C.=35±5) was carried out. The copolymer was produced in the presence of a catalytic system consisting of $AlEt_2Cl+VAc_3$ (vanadium triacetylacetonate) and in the presence of $ZnEt_2$ as molecular weight regulator.

The contents of catalyst residues in the raw polymer (before purification) were:

V=160 p.p.m.   Al=410 p.p.m.   Cl=860 p.p.m.

These contents were lowered, after 1 hour of the washing cycle, to the following values:

V=15 p.p.m.   Al=15 p.p.m.   Cl=180 p.p.m.

EXAMPLE 3

In the apparatus described in Example 1, under the same operating conditions and in the presence of the same amounts of the same washing solution, but in the absence of the solvent and of the air treatment, i.e., under a propylene atmosphere, 10 l. of a liquid propylene suspension containing 30% by weight of an ethylene/propylene (46% by weight)/6 - methyltetrahydroindene (4.8% by weight) terpolymer (ML (1+4) 100° C.=86 ±5) produced in the presence of a catalytic system consisting of $AlEt_2Cl+VAc_3$ and of $H_2$ as molecular weight regulator, were introduced into the washing vessel.

The catalyst residues in the raw polymer were:

V=180 p.p.m.   Al=830 p.p.m.   Cl=610 p.p.m.

These were lowered, after 1 hour of the washing cycle, to:

V=65 p.p.m.   Al=150 p.p.m.   Cl=160 p.p.m.

EXAMPLE 4

In apparatus as illustrated in the drawing, 100 l. of water, containing 20% by weight NaOH, were introduced into a 600 l. washing vessel which had been flushed with propylene and was equipped with a 500 r.p.m. stirrer. The temperature was then lowered to −20° C., and the washing vessel was charged with 22 kg. of a liquid propylene suspension containing 28% by weight of an ethylene/propylene (44% by weight)/5-methyltetrahydroindene (3.8% by weight) terpolymer (ML (1+4) 100° C. =100). The terpolymer had been prepared in propylene suspension in the presence of a catalyst consisting of $AlEt_2Cl+VAc_3$.

After 4 hours of washing, the vanadium contents in the polymer were lowered from 535 p.p.m. to 60 p.p.m.

EXAMPLE 5

100 l. of water, containing 5% by weight NaOH, and 10 l. of cyclohexane were introduced into a 600 l. washing vessel, which had been flushed with propylene, as described in Example 4. 40 l. of liquid propylene were subsequently introduced and the temperature was lowered to −1.5° C. 10 l. of air were introduced into the washing vessel. Then 7 kg. of an ethylene/propylene (45% by weight)/6-methyltetrahydroindene (4.5% by weight) terpolymer (ML (1+4) 100° C.=105±5), suspended in liquid propylene and obtained in the presence of a catalytic system consisting of $AlEt_2Cl+VOCl_3$ with $H_2$ as molecular weight regulator were added. The total contents of terpolymer in the propylene suspension in the washing vessel were 12% by weight.

The contents of catalyst residues in the raw polymer were:

V=350 p.p.m.   Al=1350 p.p.m.   Cl=1750 p.p.m.

These were lowered, after 1 hour of washing, to the following values:

V=10 p.p.m.   Al=90 p.p.m.   Cl=275 p.p.m.

EXAMPLE 6

Employing the apparatus used in Example 5, a 600 l. washing vessel was flushed with propylene and charged with 100 l. of water containing 1.8% by weight of tartaric acid and sufficient NaOH to adjust to a pH of 10.9. In addition, 20 l. of cyclohexane and 40 l. of liquid propylene were added. The temperature was lowered to 8° C. and, under these conditions, 15 kg. of an ethylene/propylene (47% by weight)/6-methyltetrahydroindene (2% by weight) terpolymer (ML (1+4) 100° C.=86 ±5), suspended in liquid propylene and prepared in the presence of a catalytic system consisting of $AlEt_2Cl+VOCl_3$ with $H_2$ as molecular weight regulator were transferred from the reactor into the washing vessel. The contents of the terpolymer in the final propylene suspension were 16% by weight.

The contents of the catalyst residues in the raw polymer before the washing were:

V=255 p.p.m.   Al=1250 p.p.m.   Cl=1600 p.p.m.

After 1 hour washing these were lowered to:

V=25 p.p.m.   Al=145 p.p.m.   Cl=270 p.p.m.

After a total of 4 hours washing, there were further lowered to:

V=15 p.p.m.   Al=145 p.p.m.   Cl=270 p.p.m.

A further analytical determination of the catalyst residues in the polymer, after having removed (and recovered) the liquid by steam-distillation, gave the following results:

V=10 p.p.m.   Al=125 p.p.m.   Cl=220 p.p.m.

EXAMPLE 7

Into the 600 l. washing vessel of Example 6, swept with propylene, were charged 200 l. of water containing 1% by weight of sodium tartrate and sufficient NaOH to adjust to a pH of 12, 10 l. of cyclohexane and a small amount of liquid propylene sufficient for adjusting the temperature to +10° C. and the pressure to 5 atm.

8 kg. of an ethylene/propylene (48% by weight)/6-methyltetrahydroindene (50% by weight) terpolymer (ML (1+4) 100° C.=120±5), obtained in propylene suspension by using a catalytic system consisting of $AlEt_2Cl+VAc_3$, were subsequently introduced into the washing vessel in a liquid propylene suspension. The contents of terpolymer in the propylene suspension were 15% by weight.

The contents of catalyst residues in the raw polymer were

V=365 p.p.m.   Al=3550 p.p.m.   Cl=2800 p.p.m.

After washing for 1 hour, and then recovering the polymer by removing the solvent and the water, the polymer had the following catalyst residue contents:

V=10 p.p.m.   Al=75 p.p.m.   Cl=140 p.p.m.

EXAMPLE 8

180 l. of water containing 1% by weight of tartaric acid and sufficient NaOH to adjust to a pH of 4.7, 8 kg. of technical grade heptane and a sufficient quantity of liquid propylene so as to lower the temperature to +10° C. were introduced into a 600 l. washing vessel as employed in Example 7. Subsequently, 6.8 kg. of an ethylene/propylene (47% by weight)/6-methyltetrahydroindene (5.3% by weight) terpolymer (ML (1+4) 100° C.=84±5), suspended in liquid propylene and obtained in the presence of a catalytic system consisting of $AlEt_2Cl+VAc_3+TiCl_3$ and in the presence of hydrogen as molecular weight regulator, were fed into the vessel.

The propylene suspension in the vessel contained 26% by weight of the terpolymer.

The raw polymer had the following contents of catalyst residues:

V=535 p.p.m.   Al=1600 p.p.m.
Ti=165 p.p.m.  Cl=1600 p.p.m.

After 1 hour of washing, these values were lowered to:

V=15 p.p.m.   Al=80 p.p.m.
Ti=10 p.p.m.  Cl=190 p.p.m.

EXAMPLE 9

150 l./hr. of water containing 1% by weight of tartaric acid and sufficient NaOH to adjust to a pH of 12, 20 l./hr. of technical grade heptane, and 130 l./hr. of a liquid propylene suspension were fed into a 600 l. washing vessel of the continuous process apparatus described in the drawing.

The propylene suspension contained 25% by weight of an ethylene/propylene (43% by weight)/6-methyltetrahydroindene (4.1% by weight) terpolymer (ML (1+4) 100° C.=115±5), produced in the presence of a catalytic system consisting of $AlEt_2Cl+VOCl_3$ and with $H_2$ as molecular weight regulator, so that 18 kg./hr. of polymer were fed into the washing vessel.

The temperature was kept at +10° C. and the pressure at 5 atm. by evaporating a small quantity of the volatile monomers, while the level in the washing vessel was maintained constant at about ⅔ of the total volume by discharging a part of the emulsion into an auxiliary vessel as necessary.

The contents of catalyst residues in the raw polymer were:

V=230 p.p.m.   Al=1550 p.p.m.   Cl=1650 p.p.m.

In the washed polymer the catalyst residues were:

V=10 p.p.m.   Al=150 p.p.m.   Cl=20 p.p.m.

EXAMPLE 10

In order to verify the efficacy of this purifying process for polymers produced in solution, the 600 l. washing vessel employed, e.g., in Example 8 was charged with 180 l. of water containing 1% by weight of sodium gluconate and sufficient NaOH to adjust to a pH of 12, 150 l. of a heptane solution of an ethylene/propylene (55% by weight) copolymer (ML (1+4) 100° C.=40±5), obtained in the presence of a catalytic system consisting of $AlEt_2Cl+VAc_3$ with $ZnEt_2$ as molecular weight regulator, and 160 l. of propylene.

The temperature in the washing vessel was kept at 4° C. by venting ethylene from the ethylene/propylene copolymer-solvent solution by keeping the solution boiling by suction and liquefaction of propylene with a suitable cooling cycle and by recycling liquid propylene to the washing vessel.

The raw polymer had the following contents of catalyst residues:

V=360 p.p.m.   Al=3600 p.p.m.   Cl=2700 p.p.m.

After 1 hour of washing and subsequent degassing of the emulsion, followed by steam distillation and the recovery of the polymer, the catalyst residue contents were reduced to:

V=15 p.p.m.   Al=85 p.p.m.   Cl=160 p.p.m.

Variations and modifications can, of course, be made without departing from the spirit and scope of the invention.

Having thus described our invention, what we desire to secure by Letters Patent and hereby claim is:

1. In a process for removing catalyst residues from saturated or unsaturated elastomeric propylene homopolymers and copolymers prepared in the presence of catalysts comprising transition metal compounds and organometallic compounds, the process comprising washing the catalyst residues out of said homopolymers or copolymers by means of an aqueous solution of an extracting agent for said catalyst residues, the improvement which comprises performing the washing in the presence of propylene monomer and in the presence of a solvent for said polymer, said monomer being maintained in the liquid state and being present in an amount of from about 1.5 to 10 parts by weight based on the weight of said polymer, said solvent being insoluble in water and being present in an amount of from about 0.5 to 5 parts by weight based on the weight of the polymer.

2. The process of claim 1 wherein said solvent is selected from the group consisting of aliphatic, cycloaliphatic and aromatic hydrocarbons.

3. The process of claim 1 wherein said aqueous solution further contains a complexing agent.

4. The process of claim 3 wherein said complexing agent is selected from the group consisting of tartaric acid, gluconic acid, and the salts of said acids.

5. The process of claim 3 wherein said aqueous solution further contains an oxidizing agent.

6. The process of claim 3 wherein said extracting agent is selected from the group consisting of organic and inorganic acids and bases.

7. The process of claim 6 wherein said extracting agent is NaOH.

8. The process of claim 1 wherein said polymer is produced by a suspension polymerization process and is washed in the reaction slurry coming from a reactor in which said suspension polymerization process is performed.

9. The process of claim 1 wherein said polymer is produced by a solution polymerization process.

10. The process of claim 1 wherein said copolymer is selected from the group consisting of saturated, amorphous, linear ethylene/propylene copolymers and unsaturated, amorphous, linear ethylene/propylene/6-methyltetrahydroindene and ethylene/propylene/5-methyltetrahydroindene.

References Cited

UNITED STATES PATENTS 3,280,090  10/1960  Scoggin _____ 260—937

JOSEPH L. SCHOFER, Primary Examiner

S. M. LEVIN, Assistant Examiner

U.S. Cl. X.R.

260—88.2 S, 94.7 R, 94.9 F

FORM PO-1050
(5/69)

UNITED STATES PATENT OFFICE
CERTIFICATE OF CORRECTION

Patent No. 3,740,381           Dated     June 19, 1973

Inventor(s) Giovanni Di Drusco and Paolo Galli

It is certified that error appears in the above-identified patent and that said Letters Patent are hereby corrected as shown below:

Column 1, line 10: "11,612/67" should read -- 11,612 A/67 --.
Column 1, line 50: "triacetylacetonate," should read -- triacetylacetonate or --. Column 1, line 70: "comprise as extracting agents" should read -- comprise, as extracting agents, --. Column 3, line 5: "solution thereby" should read -- solution, thereby --. Column 3, line 40: "slurry is fed" should read -- slurry fed --. Column 4, line 14: "20 and the organic phase" should read -- 20, and the organic phase is --. Column 4, line 15: "22, to a stripper 12" should read -- 22 to a stripper, 12 --. Column 4, line 35: "11, of" should read -- 11 of --. Column 5, line 69: "weight were" should read -- weight, were --. Column 6, line 13: "(2%" should read -- (5.2% --. Column 6, line 17: "regulator were" should read -- regulator, were --. Column 7, line 54: "solution by" should read: -- solution, by --. Column 8, last line of claim 10: "hydroindene" should read -- hydroindene terpolymers. --.

Signed and sealed this 9th day of April 1974.

(SEAL)
Attest:

EDWARD M. FLETCHER, JR.
Attesting Officer

C. MARSHALL DANN
Commissioner of Patents